United States Patent
Kiya

(10) Patent No.: US 6,697,015 B2
(45) Date of Patent: Feb. 24, 2004

(54) RADAR APPARATUS

(75) Inventor: Yoshiyuki Kiya, Nishinomiya (JP)

(73) Assignee: Furuno Electric Company, Ltd., Nishinomiya (JP)

( * ) Notice: Subject to any disclaimer, the term of this patent is extended or adjusted under 35 U.S.C. 154(b) by 0 days.

(21) Appl. No.: 10/115,946

(22) Filed: Apr. 5, 2002

(65) Prior Publication Data

US 2002/0145556 A1 Oct. 10, 2002

(30) Foreign Application Priority Data

Apr. 6, 2001 (JP) ........................................ 2001-108288

(51) Int. Cl.[7] .............................. G01S 7/04; G01S 13/00
(52) U.S. Cl. ...................... 342/176; 342/175; 342/195; 345/629; 345/634
(58) Field of Search ........................... 342/23, 24, 175, 342/176–186, 195; 345/635, 629–641, 619, 660–671; 348/442

(56) References Cited

U.S. PATENT DOCUMENTS

| | | | | |
|---|---|---|---|---|
| 4,546,349 A | * | 10/1985 | Prohofsky et al. | 345/667 |
| 4,729,029 A | * | 3/1988 | Henri et al. | 348/442 |
| 5,554,990 A | | 9/1996 | McKinney | |
| 6,084,565 A | * | 7/2000 | Kiya | 345/635 |

FOREIGN PATENT DOCUMENTS

| | | | | |
|---|---|---|---|---|
| FR | 2579794 A1 | * | 10/1986 | G06F/15/66 |
| GB | 2304251 A | * | 3/1997 | G01S/7/10 |
| GB | 2338855 A | | 12/1999 | |
| JP | 63-241480 A | * | 10/1988 | G01S/7/12 |
| JP | 4-295784 A | | 10/1992 | |
| JP | 5-87905 A | * | 4/1993 | G01S/7/295 |
| JP | 5-188134 A | * | 7/1993 | G01S/7/295 |
| JP | 10-38997 A | * | 2/1998 | G01S/7/14 |

* cited by examiner

*Primary Examiner*—Bernarr E. Gregory
(74) *Attorney, Agent, or Firm*—Birch, Stewart, Kolasch & Birch, LLP

(57) ABSTRACT

A radar apparatus can supervise a target easily and can enlarge a display showing a target. The target is one of a group of multiple targets and the positions of the multiple targets are detected from radar data. The relative position of a target of interest to a radar location is determined and the display reset to enable the target of interest to be within a display window.

16 Claims, 6 Drawing Sheets

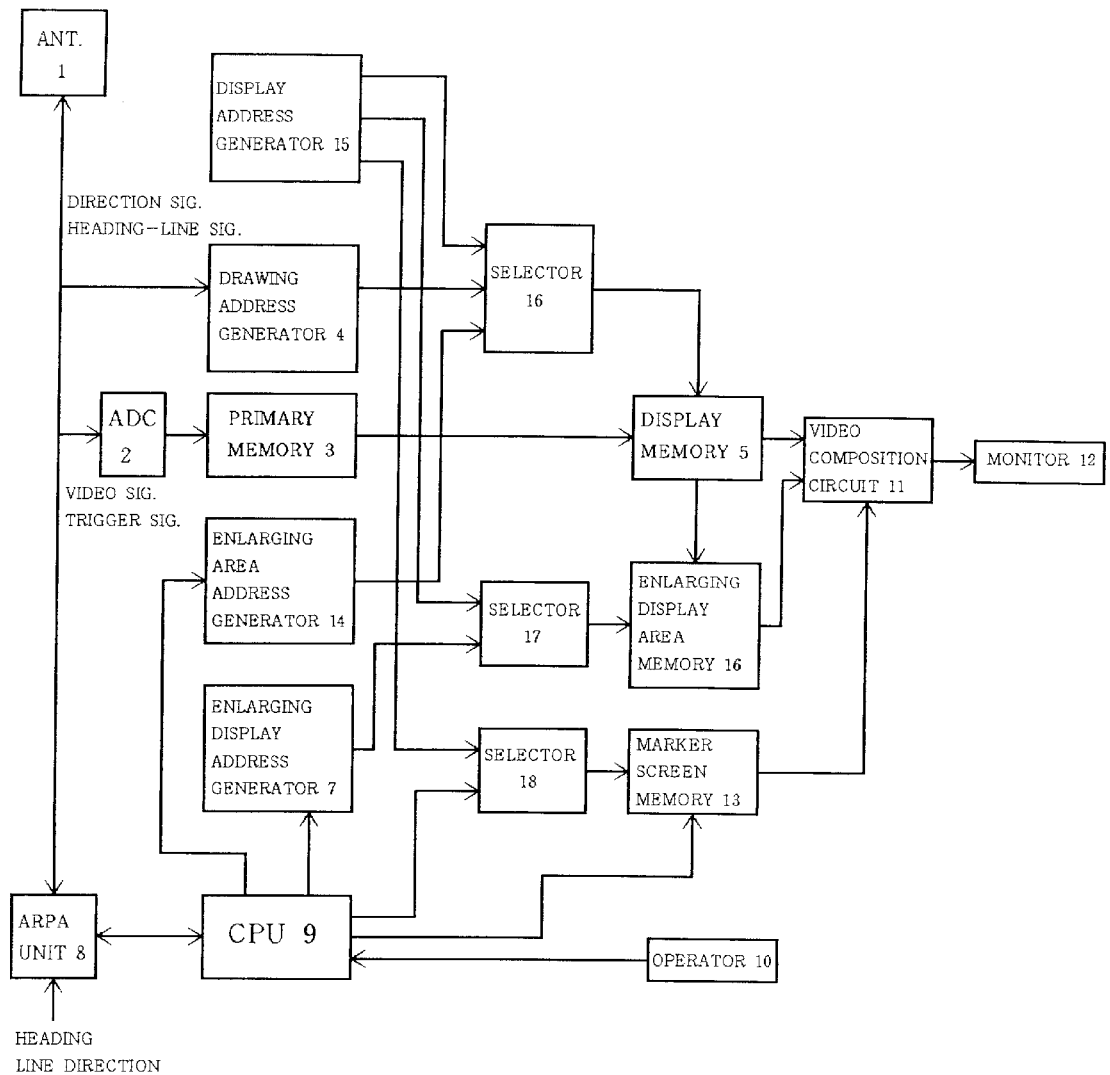

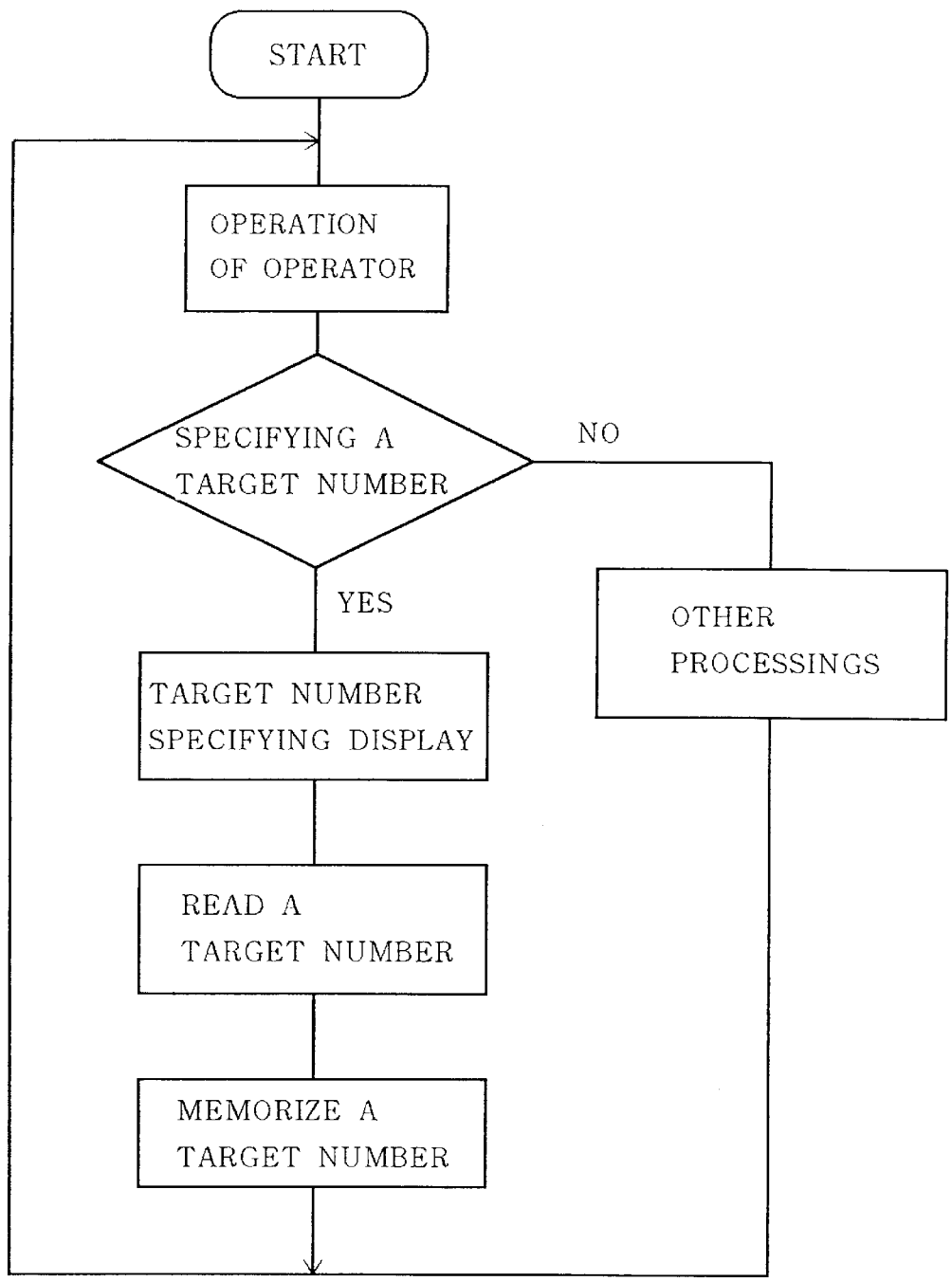
FIG.3 INPUT OPERATION PROCESSING

RADAR APPARATUS

BACKGROUND OF THE INVENTION

1. Field of the Invention

The present invention relates to a detection system/method using a radar apparatus for displaying searched surrounding conditions. More particularly it relates to a radar apparatus for enlarging an area around chosen targets and modifying the display for target motion.

2. Background Information

Conventionally, a zoom function is used in radar apparatus, allowing an operator to enlarge a desired portion of a whole radar coverage for observing smaller details within a particular area of interest.

A commonly used technique in this kind of zoom function is to place a cross-hair cursor (a pair of intersecting lines for specifying a particular location on a screen) at the center of an area to be zoomed and operate a key to execute the zoom function, whereby an enlarged image of the area around the cursor position is presented on the screen at a varied range scale., Although such a function is effective in order to preponderantly supervise the predetermined range, it is difficult to grasp the relationship of the relative position of the enlarged range and image in the whole detection area, since the whole contents of a display are changed before and after performing a zoom function.

The applicant of the present invention has filed the Japanese Unexamined Patent Publication No. 9-49874 (1997)[Tokuganhei 9-49874], in which a radar apparatus was disclosed having a plurality of display windows independently to display the whole surveillance area or some part of the display on multiple divisions of the monitor screen respectively.

Inevitably it is necessary to specify which area to enlarge (e.g., by a trackball etc.), since the function to perform the enlarging display of the predetermined range to the part in a display screen is commonly used in order to indicate and supervise the target, which exists in a radar range, by enlarging the specified area.

Additionally, another problem is that the target sometimes goes away from the enlarging display immediately, depending on the relative motion between the target and the ship.

SUMMARY OF THE INVENTION

The present invention provides an image monitoring radar apparatus by which users can supervise the predetermined target easily by the enlarging display without complicated operations.

The present invention provides a radar apparatus for displaying target objects on a screen of an indicator, having a means for detect/trail to detect and trail each target location, by detecting the location of multiple targets from the data obtained by the radar apparatus, and detecting the relative quantities of motion from the relative position changes from the ship. The present invention also has a means for specifying the target, which specifies the required target among the targets under the means for detect/trail and has a means for enlargingly display to enlarge the display area in which the targets exists, specified by the means for specifying.

The present invention makes it possible to supervise the target and its surrounding area easily by the simple method of previously selecting the predetermined target among the two or more targets.

Moreover, the present invention can enlargingly display the area, centering the position of the above-specified target.

Thereby, the predetermined range of the circumference is enlargingly displayed, centering the position of specified target.

Moreover, the present invention can periodically update the position of a target specified by a target specification means by detecting and trailing by the means for detect/trail. Therefore, it's possible to enlargingly display the range of the target and its circumference all the time, even if the target relatively changes the position against the ship.

Moreover, the present invention comprises the means to fix the enlarging area until the target arrives at the end of the enlarged displayarea, and to change the enlarged area so that the pre-specified target will be displayed far from the end of the display when the target arrives at the end of the above-mentioned enlarging area.

The present invention can detect the relative motion of the target which is enlargingly displayed and prevents the target from overflowing an enlarging display part.

BRIEF DESCRIPTION OF THE DRAWINGS

FIG. 1 shows a block diagram of a radar apparatus concerning the first embodiment;

FIG. 3 illustrates a flowchart showing a processing procedure of the CPU in the radar apparatus;

LEGEND

Figure 2A:
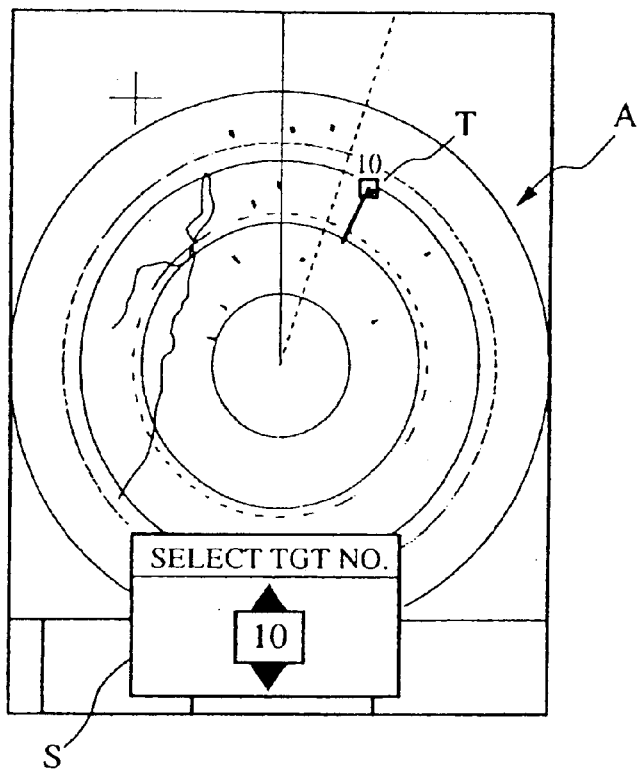
FIGS. 2A and 2B show a screen-display example of a monitor of the radar apparatus.

A —radar search area display part
C —enlarging area
Z —enlarging display part
S —display part for target number specification
T —target mark

DETAILED DESCRIPTION

A radar according to a first embodiment of the invention is now described with reference to FIGS. 1–4.

We consider a means for detect/trail referred to as ARPA (Automatic Radar Plotting Aid) in this embodiment.

FIG. 1 is a block diagram of a radar apparatus.

The antenna 1 is equipped with the radar antenna and the transceiver part in FIG. 1.

The AD converter 2 synchronizes with a transmitting trigger signal from the antenna 1, and changes the signal into digital data while it samples a video signal to the timing of a distance clock.

The primary memory 3 accumulates the data for one sweep.

The drawing address generator 4 generates the address signal for writing in the display memory 5 while changing the contents of the primary memory 3 into rectangular coordinates from polar coordinates, by inputting the direction signal of the antenna from the antenna part 1

A selector 16 changes the address signal over the display memory 5.

The ARPA unit 8 finds, detects and trails the target position from a radar echo by inputting the direction signal, a heading-line signal, a trigger signal, and a video signal respectively from the antenna part 1, and the heading-line direction from a gyrocompass etc.

CPU9 writes the data in the marker screen memory 13 for displaying the mark which shows the target under detect/trail based on the position data of target currently caught and followed by the ARPA unit 8

A selector 18 changes the address signal over the marker screen memory 13.

Moreover, CPU9 receives operations of the operator 10, such as a trackball or a touch panel, and performs various processings, such as a change of a range, and a change of the display mode.

The enlarging-area address generator 14 generates the address of the area one by one which should be enlarged among the display data currently written in the display memory 5.

The enlarging-display address generator 7 generates the address of which position in the enlarging-display area memory 6 to write the data of the display memory 5 whose address was specified by the enlarging-area address generator 14 in the position of the memory 6.

The predetermined area in the display memory 5 is enlargingly copied to the enlarging-display area memory 6 by address generating of the enlarging-area address generator 14 and the enlarging-display address generator 7

In addition, a selector 17 changes the address signal over the enlarging-display area memory 6.

The display address generator 15 generates the address signal which should be read to the display memory 5 for a display through a selector 16, generates the address signal for a display to the enlarging-display area memory 6 through a selector 17, and generates the address signal for a display to the marker screen memory 13 similarly through a selector 18.

The video composition circuit 11 compounds the data read from the display memory 5, the enlarging-display area memory 6, and the marker screen memory 13, respectively, and outputs it to the monitor 12 as a display signal.

The monitor 12 performs one screen display based on this display signal.

Figure 2B:
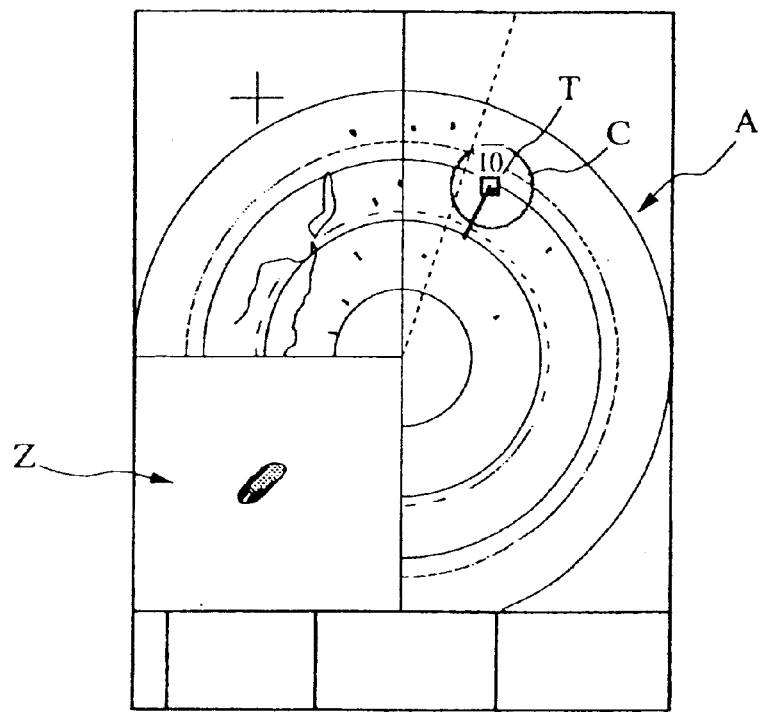

FIGS. 2A–2B show a display of the monitor in a radar apparatus.

FIG. 2(A) shows the state of specifying which target and its circumference to enlarge among the targets currently caught and followed by the ARPA function. A is the whole radar search area, and T is one target which is displayed on the display part of the whole radar search area.

In this embodiment, it displays the rectangle mark to show that the target is under detect and trail, a target number, and the move direction and speed of the target are also displayed as a target mark, as well as the target echo.

S is a division (window) for specifying by the number which target to enlargingly display, and shows the state in which the target number "10" is specified.

FIG. 2(B) shows a display after specifying the above-mentioned target number "10".

Here, Z is an enlarging display part.

C is a circular mark to show the enlarging area to be enlargingly displayed.

The target echo of a target number "10" is- displayed on the enlarging display part Z.

Figure 4:
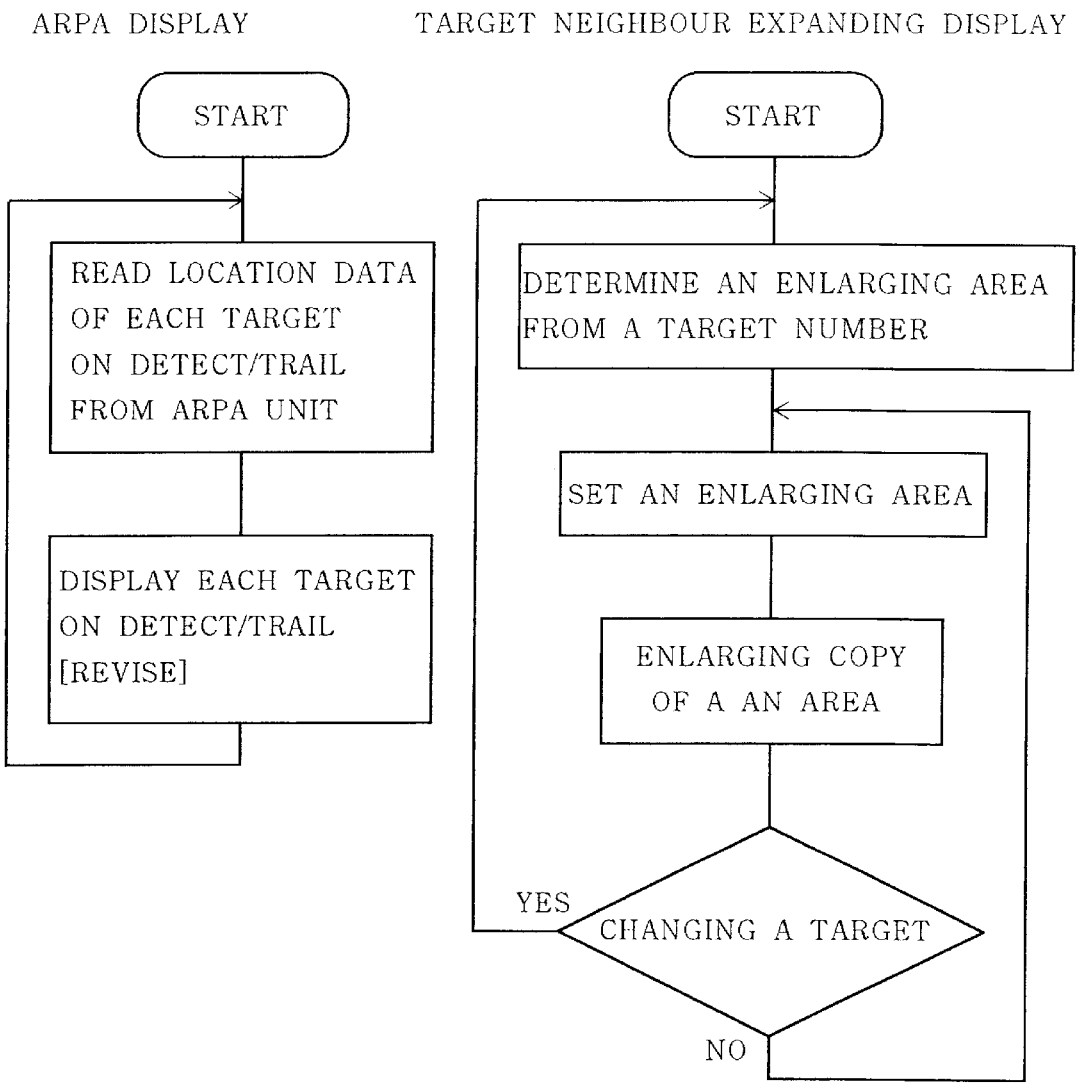
FIG. 4 illustrates a flowchart showing a processing procedure of the CPU in the radar apparatus

Next, the processing procedure of CPU9 shown in FIG. 1 is explained based on flowcharts shown in FIGS. 3 and 4.

FIG. 3 is a processing procedure concerning input operation processing.

First, the operation of operator, such as a trackball and a key input part, is read.

If the operation for specifying a target number is performed by operation of this operator, the target number specifying display part S willube displayed on a window as shown in FIG. 2(A).

Then, the input operation of the target number by the operator is read, and the number is memorized.

A setup (selection) of magnifying power etc. is performed in "other processings" in FIG. 3.

FIG. 4 shows the processing of an ARPA display, and the processing of an enlarging display of the specified target and its circumference.

In an ARPA display, the position data of each target under the present detect/trail is first read from an ARPA unit.

Then, a target mark is displayed on the target position under its present detect/trail.

By repeating this processing, the display position of a target mark is moved according to the relative position change of each target to a ship.

In specifying the target and its circumference enlarging display processing, it determines a predetermined enlarging area including the position of corresponding target according to the target number specified by operation of the operator as mentioned before, and sets it up.

Specifically, a datum point and magnifying power are set for the enlarging-area address generator 14 shown in FIG. 1.

Then, the contents of the enlarging area in the display memory 5 are written in the enlarging-display area memory 6 with the enlarging copy system, after making the operation of the enlarging-display address generator 7 effective.

As shown FIG. 2(B), the specified target is enlargingly displayed in the display part Z in a display screen.

Then, if there is no change of specifying target by operation of an operator, an enlarging area will be set up again, according to the present position of the specified target.

Even if there is relative movement of specified target by repeating the above processing, the area which always includes the position of specified target is displayed on an enlarging display part by repeating the above-mentioned operation.

If there is change of specified target by operation of an operator, it will determine an enlarging area according to the position of specified target after the change, and it will be set.

This performs an enlarging display about specified target after the change.

In the above-mentioned example, the resolution on data does not change with expansions, since the contents once written in the display memory 5 shown in FIG. 1 are just copied into the enlarging-display area memory 6 with the enlarging copy system However, if the number of pixels in every direction written in the display memory 5 is set up beforehand finely from resolution on the display screen of the monitor 12, the picture of high resolution can be displayed on the enlarging display part S from the radar search area display part A.

Next, a radar according to a second embodiment of the invention is now described with reference to FIGS. 5A–C and FIG. 6.

In the second embodiment, the present invention fixes the enlarging area until the specified target arrives at the end of the above-mentioned enlarging display part, and controls the position of the target not to overflow from an enlarging display part when the target arrives at the end of the above-mentioned enlarging display area, although the target is displayed in the center of an enlarging display part by specifying the target to be specified in the first embodiment.

Figure 5A:
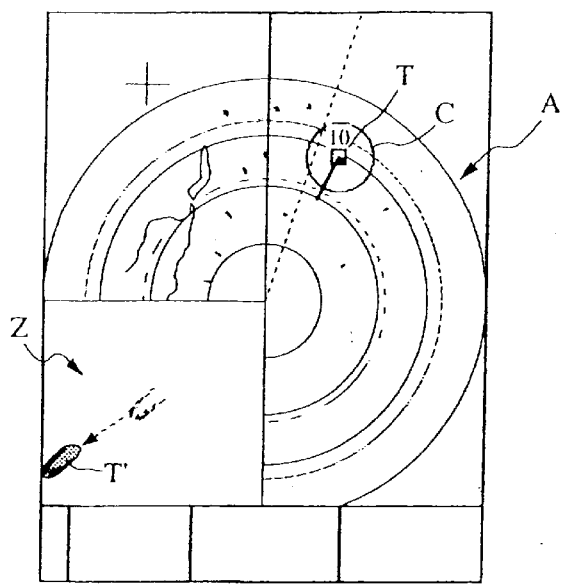
FIGS. 5A–5C show a screen-display example of a monitor of the radar apparatus concerning the second embodiment.
Figure 5B:
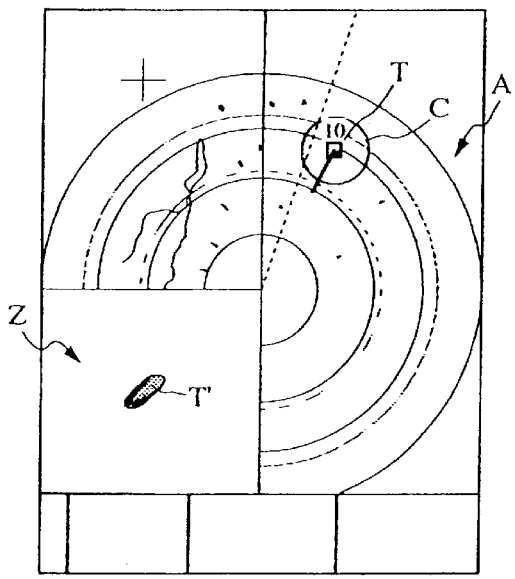
Figure 5C:
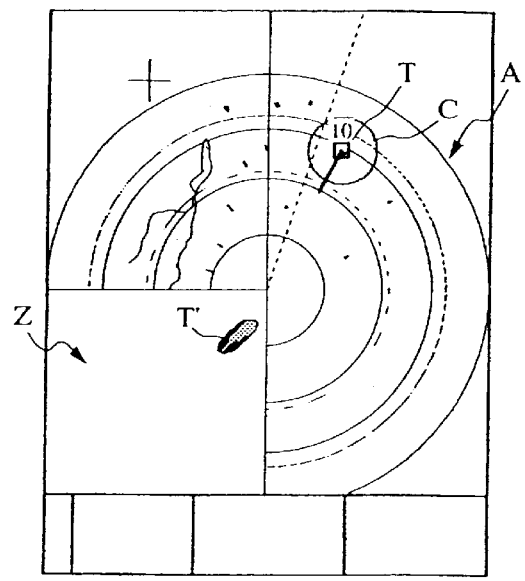

FIGS. 5A–C show the example of display change of the enlarging display part Z.

If the target to be enlarged is specified, although the target T' is displayed in the center of the enlarging display part Z as shown in FIG. 2(B), the enlarging area is fixed until the target T' arrives at the end of the enlarging display part Z.

As shown in FIG. 5(A), when the target T arrives at the end of the enlarging display part Z, an enlarging area is changed so that target T' may be displayed in the center of an enlarging-display area as shown in FIG. 5(B).

Alternatively, as shown in FIG. 5(C), an enlarging area is changed so that the target T' should be displayed on the opposite side (symmetrical position which makes the center of the enlarging display part Z a symmetrical point) of the end which is going to protrude.

Figure 6:
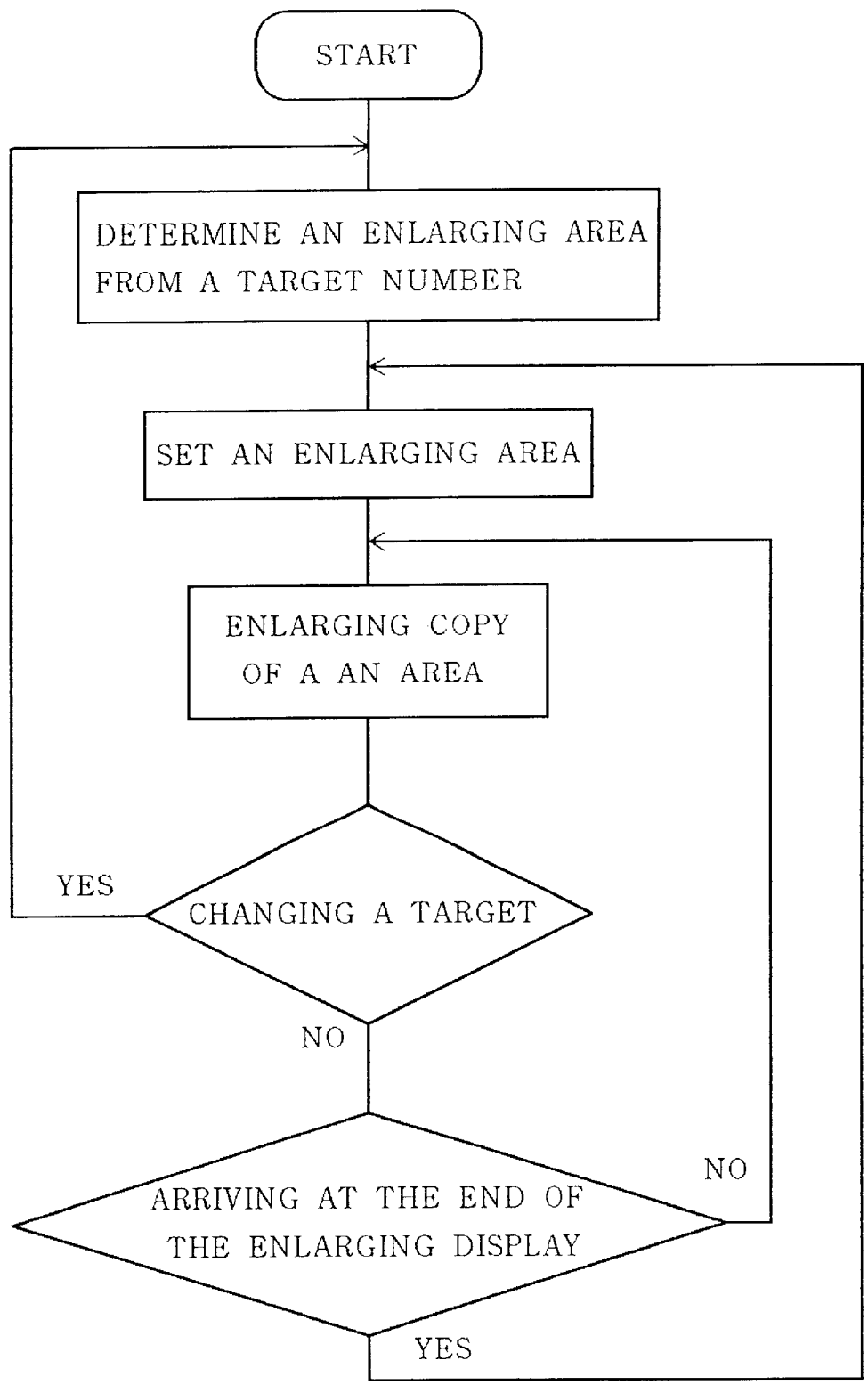
FIG. 6 illustrates a flowchart showing a processing procedure of the CPU in the radar apparatus.

FIG. 6 is a flowchart showing the processing procedure for the above-mentioned enlarging display.

First, it determines a predetermined enlarging area including the position of a corresponding target according to the target number specified by operation of the operator as mentioned before, and it is set.

Specifically, a. datum point and magnifying power are set for the enlarging-area address generator 14 shown in FIG. 1.

Then, the contents of the enlarging area in the display memory 5 are written in the enlarging-isplay area memory 6 with the enlarging copy system, after making the operation of the enlarging-display address generator 7 effective.

Then, the enlarging copy of the above-mentioned enlarging area is repeated, and is performed until the specified target arrives at the end of the enlarging display part Z.

That is, an enlarging area is kept fixed.

If the specified target reaches at the end of the enlarging display part Z, a re-setup of an enlarging area will be performed.

That is, as shown in FIG. 5(B) or FIG. 5(C), an enlarging area is set up so that a target should be displayed on the center of the enlarging display part Z, or the end by the side of opposite as mentioned above.

It, is displayed that target moves in the inside of an enlarging area until the target arrives at the end of the enlarging display part Z, and the target is displayed in the center of the enlarging display part or the opposite end of the display when the target arrives at the end of the enlarging display part Z, by repeating the above processing.

In addition, it is also possible to have another monitor independently from the monitor for displaying the whole radar search area, for performing an enlarging display, although the part in one display screen of a monitor was made into the enlarging display part in the first and second embodiment of the invention shown above.

Moreover, the sampling system of the video signal outputted from an antenna part in addition to the method of copying into the enlarging-display area memory 6 the contents once written in the display memory 5 shown in FIG. 1. by the enlarging copy system or subsequent ones is usually divided into the signal processing for a display, and the signal processing for an enlarging display, and it is good as for two lines.

Furthermore it is also possible to set up independently the display mode of the whole radar search area and of an enlarging area part although there are head-up mode, North-up mode, course-up mode, etc., for radar display modes.

What is claimed is:

1. A radar apparatus for displaying multiple targets on a screen of an indicator, comprising:
    means for detecting/trailing multiple targets wherein said means for detecting/trailing detects and trails the location of each of the multiple targets using data obtained by the radar apparatus, and detecting the radar location;
    means for specifying a target a of interest among the multiple targets; and
    means for display enlarging, wherein said means for display enlarging displays the area in which the target of interest exists.

2. The apparatus of claim 1 wherein said means for display enlarging centers the position of the target of interest and the area round the target of interest.

3. The radar apparatus of claim 2, further comprising:
    means of fixing, wherein said means of fixing changes the area displayed when the target of interest arrives at an end of the area displayed.

4. The apparatus of claim 1 or 2, wherein said means for detecting/trailing periodically updates the position of the target of interest.

5. The radar apparatus of claim 4, further comprising:
    means of fixing, wherein said means of fixing changes the area displayed when the target of interest arrives at an end of the area displayed.

6. The radar apparatus of claim 1, further comprising:
    means of fixing, wherein said means of fixing changes the area displayed when the target of interest arrives at an end of the area displayed.

7. A method of displaying radar data information comprising:
    displaying radar images of several targets on a display screen in a first display window, wherein the view within the first display window represents a real region of interest about and enompassing the several targets, and where the first display window has a particular scale in relation to the real region of interest;
    selecting a particular target from the several targets;
    creating a second display window within the first display window, wherein said second display window images a second real region of interest about and encompassing the particular target, and where the second display window has a scale different from the first display window; and
    modifying said second display window so that the image of the particular target remains within the said second display window.

8. The method according to claim 7, wherein an operator selects the particular target by use of an interactive device.

9. The method according to claim 8, wherein the interactive device is a trackball.

10. The method according to claim 7, wherein the step of modifying includes tracking the particular target position and the relative position between the particular target and a radar responsible for the radar data used in the first display window, and when the target position would lie outside the region of interest displayed in said second window, setting a third real region of interest about and encompassing the particular target in said second display window, where the image of the particular target in said second display window is centered in said second display window.

11. The method according to claim 7, wherein the step of modifying includes tracking the particular target position and the relative position between the particular target and a radar responsible for the radar data used in the first display window, and when the target position would lie outside the region of interest displayed in said second window, setting a third real region of interest about and encompassing the particular target in said second display window, where the image of the particular target in said second display window is set opposite a side of the second display window representing the boundary through which the particular target would have passed if not reset.

12. An apparatus for displaying radar data information comprising:

a display means, where said display means displays radar images of several targets on a display screen in a first display window, wherein the view within the first display window represents a real region of interest about and encompassing the several targets, and where the first display window has a particular scale in relation to the real region of interest;

a specifying means for selecting a particular target from the several targets;

an enlarging means, where said enlarging means creates a second display window within the first display window, where said second display window images a second real region of interest about and encompassing the particular target, and where the second display window has a scale different from the first display window; and a detect/target means, where said detect/target means tracks the particular target position and the relative position between the particular target and a radar responsible for the radar data used in the first display window.

13. The apparatus according to claim 12, wherein said specifying means includes an interactive device enabling an operator to select the particular target.

14. The apparatus according to claim 13, wherein the interactive device is a trackball.

15. The apparatus according to claim 12, wherein said enlarging means sets a third real region of interest about and encompassing the particular target whose image has been recentered in said second display when the target position would lie outside the second region of interest displayed in said second window.

16. The apparatus according to claim 12, wherein said enlarging means sets a third real region of interest about and encompassing the particular target whose image is set opposite a side of the second display window representing the boundary through which the particular target would have passed if not reset.

* * * * *